(12) United States Patent
Lacage et al.

(10) Patent No.: US 9,058,376 B2
(45) Date of Patent: Jun. 16, 2015

(54) SCORING OF INTERRELATED MESSAGE ELEMENTS (71) Applicant: ALCMEON, Paris (FR)

(72) Inventors: Mathieu Lacage, Antibes (FR); Bertrand Stephann, Paris (FR)

(73) Assignee: ALCMEON, Paris (FR)

( * ) Notice: Subject to any disclaimer, the term of this patent is extended or adjusted under 35 U.S.C. 154(b) by 259 days.

(21) Appl. No.: 13/839,070

(22) Filed: Mar. 15, 2013

(65) Prior Publication Data

US 2014/0280235 A1  Sep. 18, 2014

(51) Int. Cl.
G06F 7/00 (2006.01)
G06F 17/30 (2006.01)
G06Q 50/00 (2012.01)

(52) U.S. Cl.
CPC .... *G06F 17/30616* (2013.01); *G06F 17/30864* (2013.01); *G06F 17/30722* (2013.01); *G06Q 50/01* (2013.01)

(58) Field of Classification Search
CPC ............... G06F 17/30616; G06F 17/30722; G06F 17/30864; G06F 17/30675; G06Q 50/01; H04L 12/1813
USPC ......................................................... 707/749
See application file for complete search history.

(56) References Cited

U.S. PATENT DOCUMENTS

| | | | | |
|---|---|---|---|---|
| 7,974,983 | B2* | 7/2011 | Goeldi | 707/769 |
| 2008/0109419 | A1 | 5/2008 | Murakami et al. | |
| 2010/0312769 | A1* | 12/2010 | Bailey et al. | 707/740 |
| 2011/0196855 | A1* | 8/2011 | Wable et al. | 707/711 |
| 2011/0208822 | A1* | 8/2011 | Rathod | 709/206 |
| 2011/0231296 | A1* | 9/2011 | Gross et al. | 705/37 |
| 2014/0229493 | A1* | 8/2014 | Hong et al. | 707/748 |

OTHER PUBLICATIONS

Jun Zhang, Mark S. Ackerman, Lada A. Adamic, "Expertise Networks in Online Communities: Structure and Algorithms", 2007 (pp. 665-674).

Lada A. Adamic, Jun Zhang, Eytan Bakshy, Mark S. Ackerman, "Knowledge Sharing and Yahoo Answers: Everyone Knows Something", 2008 (pp. 665-674).

(Continued)

*Primary Examiner* — Tony Mahmoudi
*Assistant Examiner* — Merilyn Nguyen
(74) *Attorney, Agent, or Firm* — Young Basile (57) ABSTRACT

A structured collection of message elements comprising message elements and oriented child-parent links each connecting a message element to a parent message element is provided. Each message element comprises a message content and metadata including an author identity and a timestamp. The message contents are parsed to generate appreciative phrase marks assigned to the message elements. An appreciative phrase mark is generated in response to detecting that the parsed message content of a later message element comprises a string of characters that matches an entry within a predefined dictionary of regard-expressing phrases. The appreciative phrase mark is assigned to an earlier message element that is connected to the later message element by a sequence of child-parent links. The metadata is parsed to detect the marks and further regard indicators assigned to the message elements. Relevance scores of the message elements are computed as a function of the regard indicators.

21 Claims, 4 Drawing Sheets

(56) References Cited

OTHER PUBLICATIONS

Eugene Agichtein, Carlos Castillo, Debora Donato, Aristides Gionis, Gilad Mishne, "Finding High-Quality Content in Social Media", 2008 (11 pages).

Erik Aumayr, Jeffrey Chan and Conor Hayes, "Reconstruction of Threaded Conversations in Online Discussion Forums", Association for the Advancement of Artificial Intelligence, 2011 (8 pages).

Anna Shtok, Gideon Dror, Yoelle Maarek, Wan Szpektor, "Learning from the Past: Answering New Questions with Past Answers", 2012 (pp. 759-768).

* cited by examiner

SCORING OF INTERRELATED MESSAGE ELEMENTS

TECHNICAL FIELD

The invention relates to the technical field of information retrieval and sorting, in particular the invention relates to methods and devices for computing relevance scores of message elements, in particular message elements generated by members of online communities.

BACKGROUND

The availability of user-generated content on the Internet keeps increasing due to pervasive use of online community systems such as forums, question and answer (Q&A) sites or social networks by people of all age groups and origins. However, the quality of such content in terms of intelligibility, accuracy, and relevance to a given topic varies drastically from excellent to spam.

The functionality of online community systems evolves to enable users to generate an increasingly richer variety of information in addition to content itself, e.g. user-generated feedback such as votes or ratings.

However, user-generated feedback may suffer from bias due to user-felt social obligations e.g. for direct reciprocity, which are inherent to all kinds of social interactions.

Accordingly, computer-implemented methods adapted to reliably evaluate, sort and triage vast amounts of user-generated contents to mine high-quality content are desirable.

Economists observe that exchange within human communities is very generally structured around reputation and regard-based behaviors (see "Between the gift and the market: the economy of regard" by Avner Offer in Economic History Review, L3 3 (1997), pp. 450-476).

SUMMARY

In an embodiment, the invention provides a computer-implemented method for assigning relevance scores to message elements, the method comprising: providing a structured collection of message elements stored in a data repository, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, parsing the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parsing the metadata of the plurality of message elements to detect regard indicators assigned to the message elements, wherein a regard indicator assigned to a message element results from an action performed by a reader of the message element, wherein the regard indicators include the appreciative phrase marks, and computing relevance scores of the message elements as a function of the regard indicators assigned to the message elements.

Economists observe that exchange within human communities is very generally structured around reputation and regard-based behaviors (see "Between the gift and the market: the economy of regard" by Avner Offer in Economic History Review, L3 3 (1997), pp. 450-476).

In an embodiment, the relevance score is a binary selection flag to the effect that a subset of the messages elements is selected as a result of the above method. In another embodiment, the relevance score is a quantitative rating that makes it possible to sort the message elements in an increasing or decreasing order of the relevance scores.

According to embodiments, such methods may comprise one or more of the features below.

In embodiments, a variety of regard indicators may be relied upon in addition to the regard-expressing phrase marks. For example, the regard indicators assigned to a message element may further include appreciative action marks selected in the group consisting of positive vote metadata resulting from a positive vote given by a reader of the message element, positive status metadata resulting from a status of the message element being changed to a positive status by a reader of the message element, positive rating metadata resulting from a positive rating given by a reader of the message element, bookmark metadata resulting from the message element being stored in the bookmarks of a reader, and forward metadata resulting from the message element being retransmitted to another recipient by the reader, e.g. quoted, forwarded, re-tweeted, broadcast or somehow re-used in a further message by a reader.

In an embodiment, the regard indicators further include citation marks. For example, the method further comprises parsing the message contents of the plurality of message elements to generate citation marks assigned to the message elements, wherein a citation mark is generated in response to detecting that the message content of a later message element comprises the message content of an earlier message element that is connected to the later message element by a sequence of one or more child-parent links, and wherein the method comprises assigning the citation mark to the earlier message element.

In embodiments, the method further comprises: in response to detecting the string of characters in the message content of a first message element, retrieving a plurality of earlier message elements to which the first message element is connected by a sequence of one or more child-parent links, and assigning the appreciative phrase mark to a second message element selected among the retrieved plurality of earlier message elements.

To select the second message element among all possible candidates, several criteria may be used, e.g. message date or structure or message content attributes. In an embodiment, the method further comprises: determining a semantic similarity between the message content of the first message element and the message content of each of the retrieved plurality of message elements, and selecting the second message element as a function of the semantic similarity.

To compute the relevance scores based on the regard indicators, a variety of methods may be employed. In an embodiment, a link-based rank computation method is employed. For example, the method further comprises: generating a graph of authors comprising a collection of author nodes corresponding to the author identities comprised in the plurality of message elements and a collection of oriented regard links each associated to a respective appreciative phrase mark, wherein a regard link associated to an appreciative phrase mark originates from an author node corresponding to the author identity of the later message element comprising the regard-expressing phrase and points to an author node corresponding to the author identity of the earlier message element to which the appreciative phrase mark is assigned, and applying a link-based rank computation method to the graph of authors to determine link-based ranks of the author nodes, wherein the relevance score of a message element is computed as a function of the link-based rank of the author node corresponding to the author identity of the message element.

Such a link-based rank computation method may take into account regard indicators of all kinds in addition to the appreciative phrase marks. For example, the method further comprises generating a further regard link between author nodes, wherein the further regard link corresponds to a regard indicator which results from an action performed by the author of a message element of the plurality of message elements, wherein the further regard link originates from the author node corresponding to the author who performed the action and points to an author node corresponding to the author identity of the message element to which the regard indicator is assigned.

In embodiments, the action performed comprises the giving of a positive vote to a message element by the author of another message element; and/or the changing of the status of a message element to a positive status by the author of another message element; and/or the giving of a positive rating to a message element by the author of another message element; and/or the storing of a message element in the bookmarks of the author of another message element; and/or the retransmitting of a message element by the author of another message element.

The link-based rank computation method may be implemented in diverse manners. In an embodiment the applying of a link-based rank computation method to the graph of authors comprises: assigning score counters to the author nodes, generating a plurality of paths in the graph of authors by repeatedly executing the steps of: randomly selecting a regard link among the regard links originating from a current author node, adding to a current path the author node pointed to by the selected regard link and selecting the author node pointed to by the selected regard link as the current author node, incrementing the score counter of the current author node, randomly selecting an action in the group consisting of terminating the current path to initiate a new path and iterating to the step of randomly selecting a regard link to continue the current path, executing the selected action, determining the link-based rank of an author node as a function of the score counter of the author node in response to detecting that a convergence criteria is satisfied.

In an embodiment the determining of link-based ranks of the author nodes comprises: generating a pruned graph of authors by removing from the graph of authors the regard links that satisfy a contingency criteria, and applying the link-based rank computation method to the pruned graph of authors to determine the link-based ranks of the author nodes.

In an embodiment the generating of a pruned graph of authors further comprises: applying the link-based rank computation method to the graph of authors to determine intermediate link-based ranks of the author nodes, determining that a regard link satisfies the contingency criteria in response to detecting that a ratio between the intermediate link-based rank of the author node pointed to by the regard link and the intermediate link-based rank of the author node from which the regard link originates is lower than a threshold value.

In embodiments, the structured collection of message elements may be obtained from an external source, e.g. an online community system. If necessary, various data processing steps may be employed to transform the raw message elements obtained from an external source so as to generate or enrich a hierarchical structure of linked messages. In an embodiment, the providing of a structured collection of message elements further comprises: providing the plurality of messages elements, wherein each message element comprises a message content, an author identity and a timestamp, selecting a message element and initializing a list of candidate parent message elements for the selected message element, parsing the message content of the selected message element to detect a reply indicator, wherein a reply indicator is detected in response to one of: detecting that the parsed message content comprises an author identity different from the author identity of the message element, and detecting that the parsed message content comprises a quote from the message content of another message element, updating the list of candidate parent message elements in response to detecting a reply indicator, wherein the list of candidate parent message elements is updated by adding an older message element selected in the group consisting of message elements of which the author identity matches the author identity detected in the parsed message content and message elements of which the message content matches the quote detected in the parsed message content, selecting a parent message element for the selected message element from the list of candidate parent message elements and storing an oriented child-parent link in the data repository, wherein the child-parent link connects the selected message element to the selected parent message element.

In an embodiment, the detecting that the parsed message content comprises a quote from the message content of another message element comprises: detecting a pair of quote marks in the parsed message content, determining a string of characters located between the pair of quote marks, and retrieving another message element from the plurality of message elements of which the message content includes the string of characters.

In an embodiment, the invention also provides a data processing device comprising: a data repository storing a structured collection of message elements, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, and a processor communicatively connected to the data repository, the processor being configured to: parse the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parse the metadata of the plurality of message elements to detect regard indicators assigned to the message elements, wherein a regard indicator assigned to a message element results from an action performed by a reader of the message element, wherein the regard indicators include the appreciative phrase marks, and compute relevance scores of the message elements as a function of the regard indicators assigned to the message elements.

In an embodiment, the invention also provides a computer program product comprising computer-readable instructions which cause a computer executing the instructions to: 5 access a structured collection of message elements stored in a data repository, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, parse the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parse the metadata of the plurality of message elements to detect regard indicators assigned to the message elements, wherein a regard indicator assigned to a message element results from an action performed by a reader of the message element, wherein the regard indicators include the appreciative phrase marks, and compute relevance scores of the message elements as a function of the regard indicators assigned to the message elements.

Aspects of the invention stem from the observation that feedback expressed by users in written language is likely to convey more meaningful regard than other form of feedback signals, especially than those which can be produced in a more or less automated manner, e.g. by simply pressing a button. Aspects of the invention are based on the idea of automatically detecting expressions of regard, especially costly expressions of regard, exchanged between individuals taking part in a discussion thread, e.g. members of an online community, to derive meaningful information in respect of the intrinsic value of content authored by the individuals. Aspects of the invention are based on the idea of ranking messages produced in a given discussion, e.g. messages that respond to a same original message, in particular an original message that asks a question.

BRIEF DESCRIPTION OF THE DRAWINGS

The various features, advantages and other uses of the present apparatus will become more apparent by referring to the following detailed description and drawing in which.

DETAILED DESCRIPTION

Embodiments of a method for assigning relevance scores to message elements authored by a group of individuals will now be described. The message elements may be produced in a variety of computer-implemented platforms, e.g. Question & Answer websites such as Yahoo® Answers or Stackoverflow.com®, bulletin board systems, online forums, weblogs, micro-blogging systems such as Twitter®, social networks such as Facebook® and the like. In the following, such platforms adapted to generate threads of messages will be referred to as online community systems. The basic attributes of an online community system will now be described with reference to FIG. 1.

Figure 1:
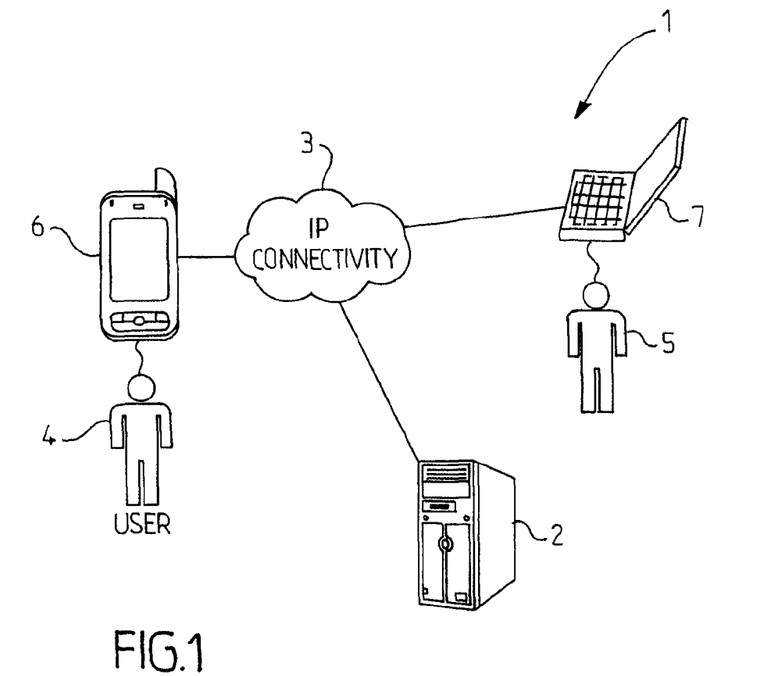
FIG. 1 is a functional representation of an online community system.

The online community system 1 comprises a central system 2 connected to a communications network 3. The central system 2 typically consists of one or more computer servers that generate interfaces for the users to interact with the community and that provide storage space for the content generated by the community. The users 4, 5 of the community system 1 gain access to the community system through user devices 6, 7, e.g. personal computers of all kinds, smartphones, tablets and the like. The user devices 6, 7 may be general-purpose computers or dedicated devices. The interface to the system is typically a graphical user interface (GUI) displayed on a screen of the user device.

Individual users of the online community system 1 may produce and share content with others and read content generated by others. The content may include all kinds of media such as text, pictures, videos, hyperlinks and others. In embodiments, the online community system also makes it possible for users to generate system-specific feedback data, which will be further described herein below. Content generated and shared within the community system will be referred to as messages or posts.

Although some platforms make it possible to generate content anonymously, a basic assumption about the online community is that users are identified in the system by an online identity that may be identical or different from their real-world identity, e.g. through the use of nicknames. Accordingly, the method focuses on content whose authors are known in the system. There are several ways for the online community system 1 to gain knowledge of the origin of a message posted. A conventional method for that purpose is a preliminary registration process of users, typically with a username and password. An authenticated signature or sender address in the post could be used for the same purpose. In general, the author identity is made visible to users who read the message.

Depending on platforms, content posted by a user 4, 5 may be available to the public at large or to all registered users of the system 1, or to a restricted group within the community users.

Accordingly, the online community system 1 offers a variety of functions to users. Basic functions generally include:

Generating and posting messages,

Defining restricted or unrestricted access to the post, e.g. selecting inclusive list of readers (white list) or exclusion list (black list), Responding to a message posted by another.

Further functions available in some platforms include feedback functions such as:

Rating a post, e.g. by selecting a number of stars on the GUI, e.g. between 0 and 5 stars, Giving a positive or negative vote for a post, e.g. by clicking a '+1' or '−1' icon on the GUI, Attaching a status tag to the message, e.g. selected within a predefined list of statuses such as 'accepted' and 'rejected'.

Further functions available in some platforms include navigation functions such as:

Bookmarking a post for later retrieval,

Storing a post in a list of favorites,

Forwarding a message posted by another or making the post available to a further group of readers, e.g. by re-posting the message in a different forum.

In general, the messages posted in the community system are organized into discussion threads, so that messages posted in response to an earlier post are grouped and displayed to users in a structure that makes it easy to understand causal relations between successive messages.

The above description of online communities is only intended to recall main aspects of such systems. Further details are known by those skilled in the art.

Figure 2:
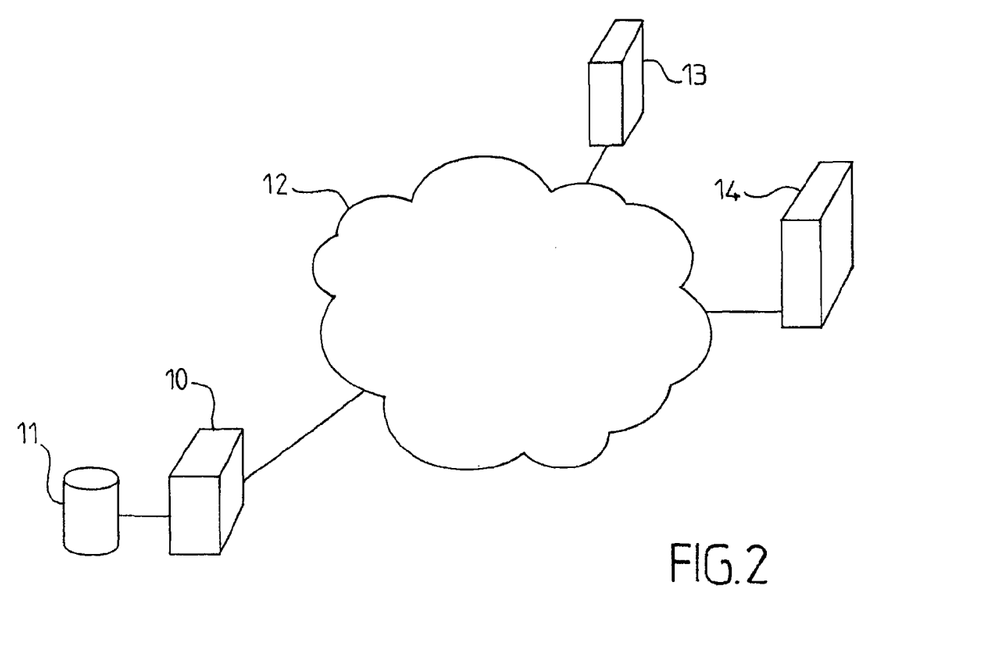
FIG. 2 is a functional representation of a computing system in which embodiments of the invention can be implemented.

Turning now to FIG. 2, there will be described a computer system adapted to process messages generated in an online community system to provide functions such as assigning relevance scores to the messages, filtering the messages, sorting the messages or simply electing a best message in a discussion.

The system comprises a computer server 10 that runs a software application to implement the methods that will be described herein below. The computer server 10 accesses a mass data storage 11 that stores the message data and metadata to be processed. In embodiments, computer server 10 may also communicate with online community systems 13, 14 through a communications network 12 to retrieve the message data and metadata to be processed from the online community systems 13, 14.

Figure 8:
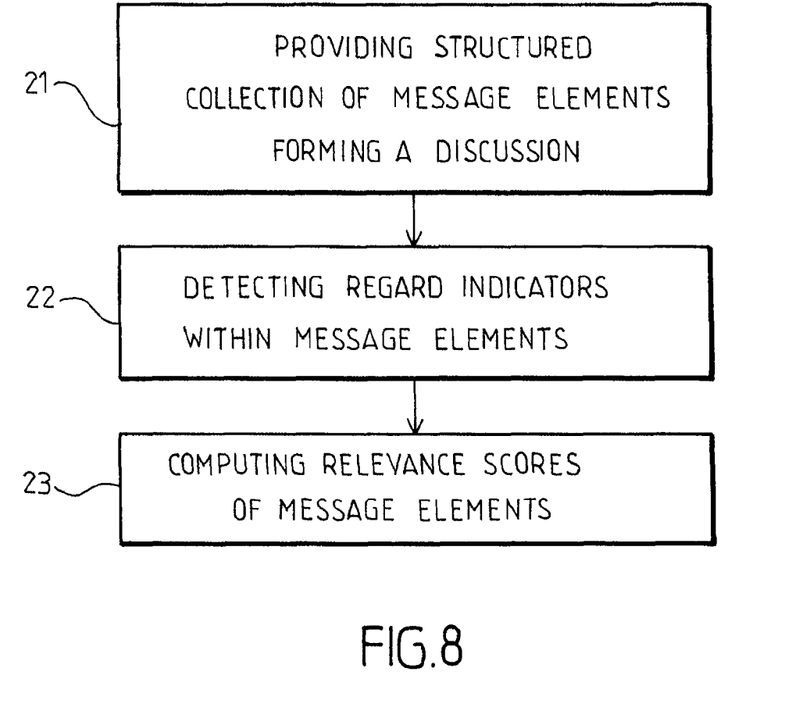
FIG. 8 is a flow diagram showing a method for scoring message elements in an embodiment.

FIG. 8 is a flow diagram showing a process executed by computer server 10 in an embodiment. In a first step 21 of the process, a structured collection of message elements forming a discussion is provided in a data repository such as mass data storage 11. The structured collection may be directly downloaded from an online community system or generated through a tree reconstruction algorithm. In a second step 22, the structured collection of messages is analyzed to detect specific patterns, links and/or events referred to as regard indicators that are likely to point to valuable content, i.e. content valued by users. In a third step 23, the detected regard indicators are processed to assign relevance scores to the messages.

In an embodiment, a filtering step is performed prior to step 21 to disregard discussion threads from the online community system that do not meet a given criterion. For example, a question recognition method may be used to filter discussion threads that start with a question, whereas all other discussion threads are disregarded. In an illustrative embodiment, the question recognition method consists of detecting whether the message having the earliest timestamp contains a question mark.

Figure 4:
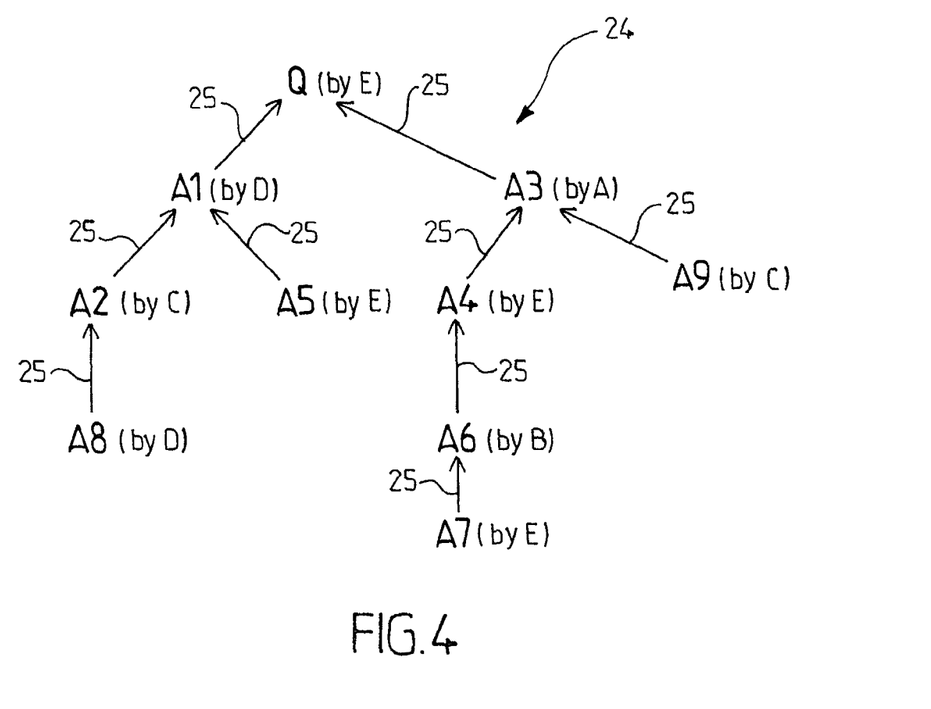
FIG. 4 is a diagram showing a collection of messages structured as a discussion.

FIG. 4 illustrates a structured collection of ten messages labeled Q, A1, A2, . . . , A9 forming a discussion 24. The messages are organized as a tree structure in which the links 25 are child-parent links that represent a causality relationship between the messages. Namely, apart from the first message Q in the discussion, each message is linked to a single parent message in response to which the child message was posted. For the sake of illustration, an example will now be given.

Assume that message Q posted by user E asks a question to a community, e.g. "My hard drive is dead. How can I replace it?" The message Q started a discussion in which four further users labeled A, B, C and D took part. In message A3 posted by user A, a first answer is given: "If I remember well, you own an Apple computer. Then, you must bring it back to customer support." In message A4, user E responded to message A3 "OK. Thanks! That looks simple. Do you know the address?" In a further message A6, user B responded to message A4: "Thank you @ Art! [@ Art is the username of user A] By the way, I found the address by googling for 'apple customer support address.'" User E then posted message A7 stating "Thanks to all". User C and D posted further messages that need not be detailed for the present example.

Depending on the online community system in which the discussion 24 was generated, there are several ways in which computer server 10 can obtain the structured discussion.

In an embodiment, the structured discussion 24 is directly downloaded from the community server 13. For that purpose, computer server 10 uses web crawlers that operate to download discussion web pages of the online community through the HTTP protocol and parse the HTML source code to retrieve relevant information. The child-parent links may be embedded in the URLs of the individual messages, for example in systems that use hierarchical URLs to store discussion threads.

In other cases, the archive of the community is provided as a large XML file e.g. every week or every month. In yet other cases, the archive of the community is accessible through public Application programming interfaces (APIs) to collect the data in a system-specific format, e.g. the json format for Twitter® posts a.k.a. tweets. The collected messages are stored in the mass data storage 11

Whatever the format of the download, the relevant information to be processed by computer server 10 consists of the message content and associated metadata, which includes at least:

Author identity of the message,

Time stamp of the message,

Identity of the parent message.

Figure 3:
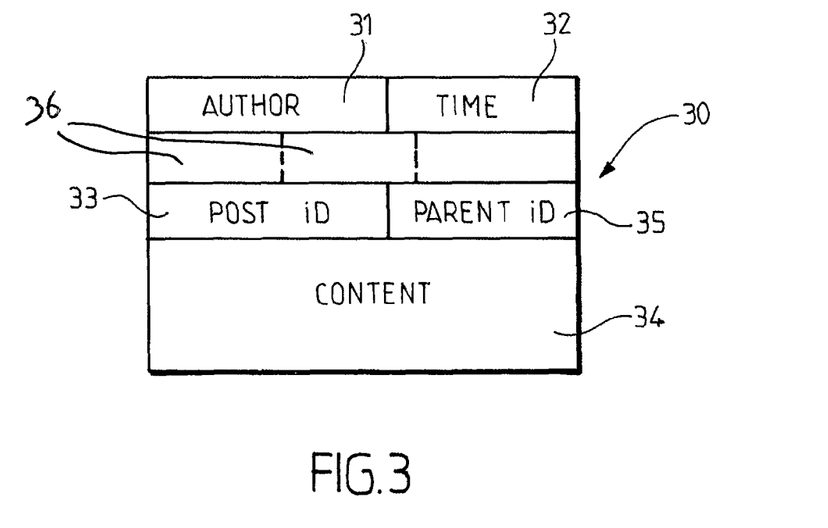
FIG. 3 is a diagram showing an embodiment of a message element.

FIG. 3 illustrates a message format that may be used for storing a message 15 element 30, i.e. message content and associated metadata. The message element 30 comprises an author field 31 for storing an author identifier, a time field 32 for storing a timestamp, a post ID field 33 for storing a message identifier, a content field 34 for storing the message content, a parent field 35 for storing an identifier of the parent message, and further fields 36 for storing additional metadata, e.g. system-specific flags relating to advanced functions such as given votes, given ranks, given status, bookmarking, retransmitting and the like.

Tree Reconstruction

In an embodiment, the computer server 10 may execute a tree reconstruction algorithm to find the child-parent links, e.g. in case those are not provided in the initial download. Various tree reconstructions algorithms known in the art may be employed.

In an embodiment the algorithm operates in three main steps as follows:

1 The original discussion is first parsed as a list of triplets (message content, username, timestamp).

2 For each message that is not the first message in the discussion, a list of candidate parent messages is created:

a Quotes i.e. strings of characters that might match the content of another message are extracted, e.g. by recognizing quote marks in content such as: user B said "You are stupid".

b For each quoted string of characters, all the messages that contain the entire quote are appended to the list of candidate parent messages.

c Cited usernames that correspond to other users who contribute to the discussion are extracted, e.g. by recognizing the @ character in usernames    d For each cited username, all the messages that were written by the corresponding user are appended to the list of candidate parent messages.

3 For each message for which a list of candidate parent messages has been obtained, a single parent message is selected within this list. The last selection may rely on various criteria e.g. creation timestamp and others.

The above tree reconstruction algorithm assigns a single parent to each child even when a user wrote a single message to answer multiple messages.

Once the structured discussion is stored in mass data storage 11, step 22 may begin. In that step, the application proceeds to parse the content of the messages in a discussion to detect strings of characters that match a predefined dictionary of regard-expressing phrases. The dictionary may be provided as a configuration file in the memory of computer server 10 and contains entries such as "Thank you", "Thanks", "+1" and similar expressions. This list is purely illustrative and not exhaustive.

Accordingly, returning to the example of FIG. 4, a match is detected when parsing message A4 because the string of characters 'Thanks' is found. Whenever a match is found the application goes on to generate digital data to record the fact that a dictionary match was found and to find an earlier post to which the regard-expressing phrase is intended to respond. The purpose of that step is to find for whom the regard expressed in the post is intended. The digital data is referred to as appreciative phrase mark and may be a binary flag or more complex data structures, e.g. combining a binary flag and an integer value for recording a regard score of the matching phrase. Once the earlier post is selected, the appreciative phrase mark is assigned to it. First, a list of candidate assignees is formed by collecting all messages located on the path from the message containing the phrase to the root of the discussion, which are not by the same author as the post containing the regard-expressing phrase. In the above example, the message containing the phrase is A4 and the root is message Q, so that messages A3 and Q are the only candidates. Secondly, various criteria may be employed to select one candidate in the list as the target, e.g. semantic relevance of the message content. In most cases, it can be assumed that the root message will always be a question that does not provide in itself the most relevant content. Therefore, the root message may be systematically discarded in that case. This would leave A3 as the only possible target in the above example. Therefore, the appreciative phrase mark is attributed to message A3.

Proceeding in this manner with all messages in the discussion yields a metric for ranking messages in accordance with the content value perceived by the users. Namely, for example, the message having the most appreciative phrase marks i.e. the message that gave rise to the highest number of regard expressing phrases, is selected as the best message and the messages are sorted in accordance with that metric. Further metrics can be derived by combining the number of appreciative phrase marks assigned to a message with other quantitative indicators, e.g. number of votes, number of citations, number of re-tweets, and the like.

In an embodiment, an augmented dictionary is used that contains both a list of regard-expressing phrases and a set of logical rules to compute and assign regard scores to expressions found in the messages. As a consequence, the regard scores make it possible to hierarchize the expressions of regard as a function of refined criteria such as syntax, number of words, punctuation, and the presence or absence of specific words, sequence of words, adjectives and other semantic elements such as punctuation marks, signs, and usernames. As an example, the phrase "Thank you" is assigned a regard score of 1, whereas the phrase "Thank you!" i.e. with exclamation point is assigned a regard score of 2.

By contrast, the regard score of a phrase may be decreased or cancelled when a negative expression is found nearby. For example, the phrase "Thank you, but . . . " is disregarded or assigned a regard score of 0.

With the computation of hierarchized regard scores that depend on the message content, more refined metrics may be used to rank messages, e.g. a sum of the regard scores of the dictionary-matching phrases found in the message.

Further metrics based on the appreciative phrase marks will now be described with reference to FIGS. 5, 6 and 7. The main idea in this embodiment is to rank the authors using a regard rank computation method.

Figure 5:
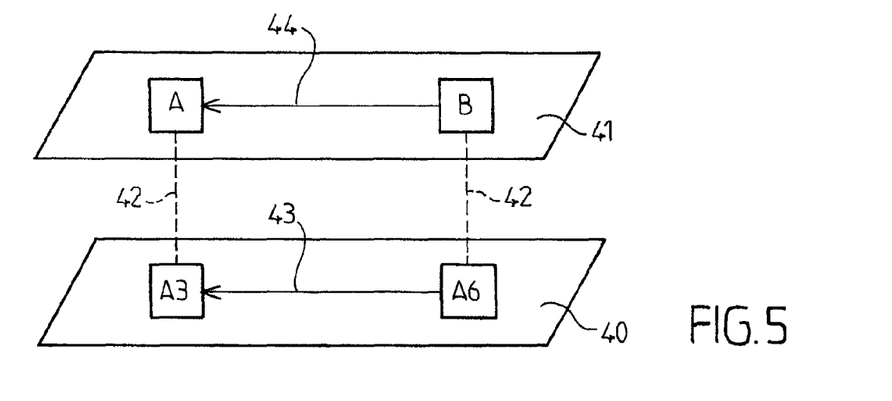
FIG. 5 is a diagram showing a regard link generated as a result of an appreciative phrase contained in a message.

With reference to FIG. 5, the generation of a regard link between authors will be described. FIG. 5 is a conceptual view of a discussion thread, which shows only a small excerpt from the discussion 24 of FIG. 4 for the sake of conciseness. The messages are shown in a message plane 40 whereas the authors are shown in an author plane 41. Authorship links 42 connect the messages in plane 40 to their authors in plane 41.

Links 43 in the message plane 40 serve to represent relations between messages generated by detecting regard expressing phrases and assigning appreciative phrase marks to messages as described above. Namely, the link 43 between message A6 and message A3 represents the result of detecting the phrase "Thank you" in message A6 and assigning the corresponding appreciative phrase mark to message A3, i.e. as a result of certain selection criteria.

In a first step, a regard link 44 in the author plane 41 is generated for each link 43 in the message plane 40. As shown, the regard link 44 connects the regard expressing author to the regard receiving author. As a result of applying this process to all messages in the discussion, a linked graph is obtained in the author plane 41. FIG. 7 shows the graph of authors in an embodiment. From a mathematical point of view, the authors A to E are nodes or vertices of the graph and the regard links 44 are edges of the graph.

In a second step, starting from such a linked graph, link-based rank computation methods may be used to compute scores of the nodes. Link-based rank computations methods known in the art include the Page rank algorithm. In an embodiment, a regard rank of the authors is computed as follows.

a In a first pass, the Page rank algorithm is run on the graph of authors shown in FIG. 5.

b The graph is pruned by removing each edge X-Y of the graph if a contingency criteria is met, namely The pruning step serves to ignore regard expressions given by highly regarded users to low-regarded users because they tend to bias the system in favor of the later.

c The Page rank algorithm is run a second time on the pruned graph.

d The Page rank of each node is assigned as the regard rank of each corresponding author.

The Page rank algorithm may be implemented as a random walk in the graph comprising the following steps:

initializing a score counter for each author node, generating a plurality of paths in the graph of authors by repeatedly executing the steps of:

randomly selecting a link among the links originating from a current author node, adding to a current path the author node pointed to by the selected link and selecting the author node pointed to by the selected link as the current author node, incrementing the score counter of the current author node, where the increment may be +1 per link or, in the embodiment with the augmented dictionary the increment may be the regard score of the phrase, randomly selecting an action in the group consisting of terminating the current path to initiate a new path and iterating to the step of randomly selecting a regard link to continue the current path, and executing the selected action, When a convergence criterion is satisfied, taking the value of the score counter or a value derived from that counter as the rank of an author node.

The above described rank computation methods may be modified to take into account further types of links between author nodes. For example, regard links between authors may be generated as a function of given votes, given ranks and similar appreciative actions performed by users of the online community system. This will be described with reference to FIG. 6. Elements identical to those of FIG. 5 are designated by the same reference numeral.

Figure 6:
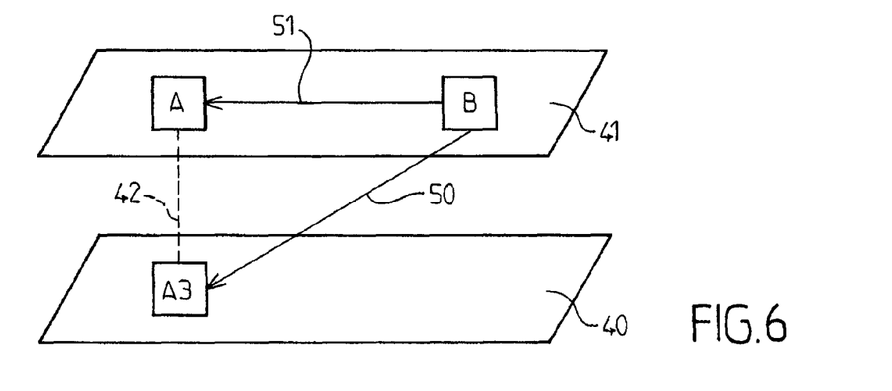
FIG. 6 is a diagram showing a regard link generated as a result of an appreciative action performed by an author.
Figure 7:
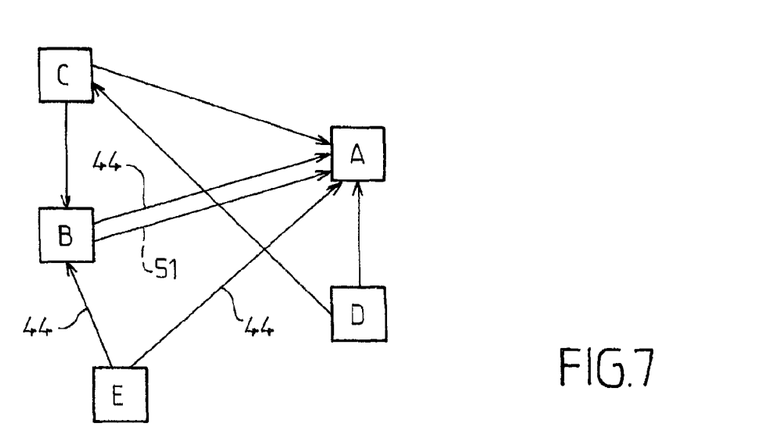
FIG. 7 is a diagram showing a collection of author nodes connected by regard links.

In the embodiment of FIG. 6, the application detects metadata of message A3 that shows that user B performed an appreciative action in respect of message A3, such as giving a vote or a positive rank to message A3, or bookmarking message A3 or re-tweeting message A3 to followers. The detected appreciative action is represented as a link 50 between user B and message A3. The application then generates a regard link 51 between the performer of the appreciative action and the author of the message targeted by the action.

Regard link 51 may be taken into account in the link-based rank algorithm in the same manner as regard link 44. In an embodiment, the algorithm discriminates in favor of more costly actions, e.g. by giving more weight to regard link 44 than regard link 51.

The regard rank of authors may be used as a self-standing metric for ranking messages in the discussion or as a secondary metric for disambiguating rank obtained from a primary metric. It will be appreciated that the metrics derived from numbers of appreciative phrase marks and the metrics derived from regard rank of authors can be combined in a number of ways to elect a best message in a discussion.

Figure 9:
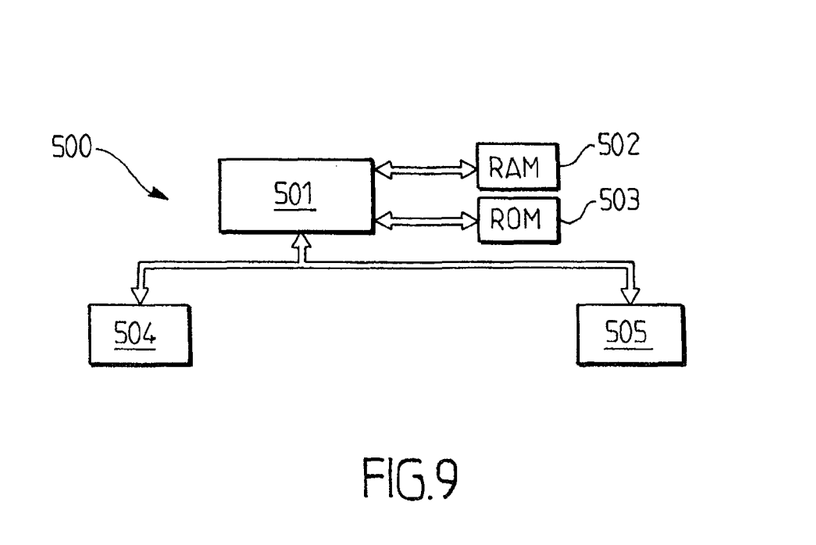
FIG. 9 is a functional representation of a computer.

FIG. 9 shows a functional diagram of a programmed computer 500 that may be used for running software applications that implement the above-described methods. Computer 500 has a core and several peripherals connected via a communication bus. The major components of the core are a microprocessor 501 (often called the CPU) random access memory (RAM) 502 and read only memory (ROM) 503. The peripherals consist of devices that allow information to be input to the system from users, output to users and stored and retrieved, i.e. mass storage devices 504 such as hard disks and network interfaces 505.

The above described methods for assigning relevance scores to messages may be used in combination with semantic search engines, e.g. to post-process the results provided by an Internet search engine in response to a query. As a consequence, when a search engine result refers to a discussion thread that matches the semantic query, the post-processing and resulting ranking of the threaded messages makes it possible to provide only the best ranking message to the end-user. Accordingly, the efficiency and reliability of a semantic search engine may be improved.

In another embodiment, the above described methods for assigning relevance scores to messages may be used to pre-process discussion threads, so as to extract only the best ranking messages. Accordingly, a filtered or condensed version of an online community archive may obtained and made available to semantic search engines, so as to speed up semantic searches e.g. on the Internet.

The invention is not limited to the described embodiments. The appended claims are to be construed as embodying all modification and alternative constructions that may be occurred to one skilled in the art, which fairly fall within the basic teaching here, set forth.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps.

In the claims, any reference signs placed between parentheses shall not be construed as limiting the scope of the claims.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A computer-implemented method for assigning relevance scores to message elements, the method comprising:

providing a structured collection of message elements stored in a data repository, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, parsing the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parsing the metadata of the plurality of message elements to detect regard indicators assigned to the message elements, wherein a regard indicator assigned to a message element results from an action performed by a reader of the message element, wherein the regard indicators include the appreciative phrase marks, and computing relevance scores of the message elements as a function of the regard indicators assigned to the message elements; and generating a graph of authors comprising a collection of author nodes corresponding to the author identities comprised in the plurality of message elements and a collection of oriented regard links each associated to a respective appreciative phrase mark, wherein a regard link associated to an appreciative phrase mark originates from an author node corresponding to the author identity of the later message element comprising the regard-expressing phrase and points to an author node corresponding to the author identity of the earlier message element to which the appreciative phrase mark is assigned, and applying a link-based rank computation method to the graph of authors to determine link-based ranks of the author nodes, wherein the relevance score of a message element is computed as a function of the link-based rank of the author node corresponding to the author identity of the message element.

2. The method in accordance with claim 1, wherein the regard indicators assigned to a message element further include positive vote metadata resulting from a positive vote given by a reader of the message element.

3. The method in accordance with claim 1, wherein the regard indicators assigned to a message element further include positive status metadata resulting from a status of the message element being changed to a positive status by a reader of the message element.

4. The method in accordance with claim 1, wherein the regard indicators assigned to a message element further include positive rating metadata resulting from a positive rating given by a reader of the message element.

5. The method in accordance with claim 1, wherein the regard indicators assigned to a message element further include bookmark metadata resulting from the message element being stored in the bookmarks of a reader.

6. The method in accordance with claim 1, wherein the regard indicators assigned to a message element further include forward metadata resulting from the message element being retransmitted to another recipient by the reader.

7. The method in accordance with claim 1, further comprising parsing the message contents of the plurality of message elements to generate citation marks assigned to the message elements, wherein a citation mark is generated in response to detecting that the message content of a later message element comprises the message content of an earlier message element that is connected to the later message element by a sequence of one or more child-parent links, and wherein the method comprises assigning the citation mark to the earlier message element, wherein the regard indicators include the citation marks.

8. The method in accordance with claim 1, further comprising: in response to detecting the string of characters in the message content of a first message element, retrieving a plurality of earlier message elements to which the first message element is connected by a sequence of one or more child-parent links, and assigning the appreciative phrase mark to a second message element selected among the retrieved plurality of earlier message elements.

9. The method in accordance with claim 8, further comprising: determining a semantic similarity between the message content of the first message element and the message content of each of the retrieved plurality of message elements, and selecting the second message element as a function of the semantic similarity.

10. The method in accordance with claim 1, further comprising generating a further regard link between author nodes, wherein the further regard link corresponds to a regard indicator which results from an action performed by the author of a message element of the plurality of message elements, wherein the further regard link originates from the author node corresponding to the author who performed the action and points to an author node corresponding to the author identity of the message element to which the regard indicator is assigned.

11. The method in accordance with claim 10, wherein the action performed comprises the giving of a positive vote to a message element by the author of another message element.

12. The method in accordance with claim 10, wherein the action performed comprises the changing of the status of a message element to a positive status by the author of another message element.

13. The method in accordance with claim 10, wherein the action performed comprises the giving of a positive rating to a message element by the author of another message element.

14. The method in accordance with claim 10, wherein the action performed comprises the storing of a message element in the bookmarks of the author of another message element.

15. The method in accordance with claim 10, wherein the action performed comprises the retransmitting of a message element by the author of another message element.

16. The method in accordance with claim 1, wherein the applying of a link-based rank computation method to the graph of authors comprises: assigning score counters to the author nodes, generating a plurality of paths in the graph of authors by repeatedly executing the steps of: randomly selecting a regard link among the regard links originating from a current author node, adding to a current path the author node pointed to by the selected regard link and selecting the author node pointed to by the selected regard link as the current author node, incrementing the score counter of the current author node, randomly selecting an action in the group consisting of terminating the current path to initiate a new path and iterating to the step of randomly selecting a regard link to continue the current path, executing the selected action, determining the link-based rank of an author node as a function of the score counter of the author node in response to detecting that a convergence criteria is satisfied.

17. The method in accordance with claim 1, wherein the determining of link-based ranks of the author nodes comprises: generating a pruned graph of authors by removing from the graph of authors the regard links that satisfy a contingency criteria, and applying the link-based rank computation method to the pruned graph of authors to determine the link-based ranks of the author nodes.

18. The method in accordance with claim 17, wherein the generating of a pruned graph of authors further comprises: applying the link-based rank computation method to the graph of authors to determine intermediate link-based ranks of the author nodes, determining that a regard link satisfies the contingency criteria in response to detecting that a ratio between the intermediate link-based rank of the author node pointed to by the regard link and the intermediate link-based rank of the author node from which the regard link originates is lower than a threshold value.

19. A computer-implemented method for assigning relevance scores to message elements, the method comprising:

providing a structured collection of message elements stored in a data repository, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, parsing the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parsing the metadata of the plurality of message elements to detect regard indicators assigned to the message elements, wherein a regard indicator assigned to a message element results from an action performed by a reader of the message element, wherein the regard indicators include the appreciative phrase marks, and computing relevance scores of the message elements as a function of the regard indicators assigned to the message elements; and providing the plurality of messages elements, wherein each message element comprises a message content, an author identity and a timestamp, selecting a message element and initializing a list of candidate parent message elements for the selected message element, parsing the message content of the selected message element to detect a reply indicator, wherein a reply indicator is detected in response to one of: detecting that the parsed message content comprises an author identity different from the author identity of the message element, and detecting that the parsed message content comprises a quote from the message content of another message element, updating the list of candidate parent message elements in response to detecting a reply indicator, wherein the list of candidate parent message elements is updated by adding an older message element selected in the group consisting of message elements of which the author identity matches the author identity detected in the parsed message content and message elements of which the message content matches the quote detected in the parsed message content, selecting a parent message element for the selected message element from the list of candidate parent message elements and storing an oriented child-parent link in the data repository, wherein the child-parent link connects the selected message element to the selected parent message element.

20. The method in accordance with claim 19, wherein the detecting that the parsed message content comprises a quote from the message content of another message element comprises: detecting a pair of quote marks in the parsed message content, determining a string of characters located between the pair of quote marks, and retrieving another message element from the plurality of message elements of which the message content includes the string of characters.

21. A data processing device comprising: a data repository storing a structured collection of message elements, the collection of message elements comprising: a plurality of messages elements, wherein each message element comprises a message content and metadata, the metadata including an author identity and a timestamp, and a plurality of oriented child-parent links each connecting a message element to an older message element called parent message element, so that each message element within the plurality of message elements is connected by a child-parent link to a parent message element within the plurality of message elements, and a processor communicatively connected to the data repository, the processor being configured to: parse the message contents of the plurality of message elements to generate appreciative phrase marks assigned to the message elements, wherein an appreciative phrase mark is generated in response to detecting that the parsed message content of a later message element comprises a string of characters that matches an entry within a predefined dictionary of regard-expressing phrases and wherein the appreciative phrase mark is assigned to an earlier message element that is connected to the later message element by a sequence of one or more child-parent links, wherein the author identity of the later message element is different from the author identity of the earlier message element, parse the metadata of the plurality of message elements to detect regard indicators assigned to the message elements, wherein a regard indicator assigned to a message element results from an action performed by a reader of the message element, wherein the regard indicators include the appreciative phrase marks, and compute relevance scores of the message elements as a function of the regard indicators assigned to the message elements; and generating a graph of authors comprising a collection of author nodes corresponding to the author identities comprised in the plurality of message elements and a collection of oriented regard links each associated to a respective appreciative phrase mark, wherein a regard link associated to an appreciative phrase mark originates from an author node corresponding to the author identity of the later message element comprising the regard-expressing phrase and points to an author node corresponding to the author identity of the earlier message element to which the appreciative phrase mark is assigned, and applying a link-based rank computation method to the graph of authors to determine link-based ranks of the author nodes, wherein the relevance score of a message element is computed as a function of the link-based rank of the author node corresponding to the author identity of the message element.

* * * * *